US006539417B2

(12) United States Patent
Stern

(10) Patent No.: US 6,539,417 B2
(45) Date of Patent: Mar. 25, 2003

(54) RECONFIGURABLE AUDIOVISUAL PREVIEWING SYSTEM AND METHOD OF OPERATION

(75) Inventor: Michael R. Stern, Mill Valley, CA (US)

(73) Assignee: PRN Corporation, San Francisco, CA (US)

( * ) Notice: Subject to any disclaimer, the term of this patent is extended or adjusted under 35 U.S.C. 154(b) by 0 days.

(21) Appl. No.: 09/131,286

(22) Filed: Aug. 7, 1998

(65) Prior Publication Data

US 2002/0099764 A1 Jul. 25, 2002

Related U.S. Application Data

(60) Provisional application No. 60/055,708, filed on Aug. 8, 1997.

(51) Int. Cl.[7] .......................... G06F 13/00; G06F 17/60
(52) U.S. Cl. .......................... 709/203; 709/217; 705/26
(58) Field of Search ........................ 709/201, 203, 709/217, 218, 219; 705/23, 26, 27

(56) References Cited

U.S. PATENT DOCUMENTS

| | | | |
|---|---|---|---|
| 3,947,882 A | 3/1976 | Lightner | 360/92 |
| 4,092,732 A | 5/1978 | Ouchi | 364/900 |
| 4,247,759 A | 1/1981 | Yuris et al. | 235/381 |
| 4,262,302 A | 4/1981 | Sexton | 358/10 |
| 4,300,040 A | 11/1981 | Gould et al. | 235/381 |
| 4,305,131 A | 12/1981 | Best | 364/521 |
| 4,405,984 A | 9/1983 | Siegel et al. | 364/410 |
| 4,414,467 A | 11/1983 | Gould et al. | 235/381 |
| 4,490,810 A | 12/1984 | Hon | 364/900 |
| 4,544,920 A | 10/1985 | Hamlin | 340/565 |
| 4,593,376 A | 6/1986 | Volk | 364/900 |
| 4,598,810 A | 7/1986 | Shore et al. | 194/205 |
| 4,616,263 A | 10/1986 | Eichelberger | 358/185 |
| 4,647,989 A | 3/1987 | Geddes | 360/55 |
| 4,654,799 A | 3/1987 | Ogaki et al. | 364/479 |
| 4,660,101 A | 4/1987 | Martin | 358/342 |
| 4,667,802 A | 5/1987 | Verduin et al. | 194/217 |
| 4,672,554 A | 6/1987 | Ogaki | 364/479 |
| 4,674,055 A | 6/1987 | Ogaki et al. | 364/479 |
| 4,685,001 A | 8/1987 | Martin | 358/342 |
| 4,685,003 A | 8/1987 | Westland | 360/14.1 |
| 4,688,105 A | 8/1987 | Bloch et al. | 358/335 |
| 4,703,465 A | 10/1987 | Parker | 369/30 |

(List continued on next page.)

FOREIGN PATENT DOCUMENTS

| | | |
|---|---|---|
| EP | 0649121 B1 | 1/2000 |
| WO | WO 95/01703 | 1/1995 |
| WO | WO 95/17704 | 6/1995 |
| WO | WO96/08113 | 3/1996 |

OTHER PUBLICATIONS

PointCast Press Release; "Broadcast Capability For Corporate Intranet" Dec. 22, 1998, pp. 1–8.
Collins, D.J.; "Using Bar Code, Why It's Taking Over"; Data Capture Institute, second edition, Feb. 29, 1991.
Tanenbaum, A.S; "Computer Networks", Third Edition; pp. 722–761; Oct. 13, 1998.

Primary Examiner—Moustafa M. Meky
(74) Attorney, Agent, or Firm—Pillsbury Winthrop LLP

(57) ABSTRACT

A reconfigurable audiovisual previewing system includes a user interface module, a media communications module, and a plurality of application programs. One of the plurality of application programs is selected and configures the interface module to identify the product of interest. The selected application program also configures the media communications module to transmit, in response to the product's identification, a request for related product information stored in said multimedia server, and to receive and play the product information retrieved from said multimedia file server in response to said transmitted request.

20 Claims, 10 Drawing Sheets

U.S. PATENT DOCUMENTS

| | | | |
|---|---|---|---|
| 4,717,971 A | 1/1988 | Sawyer | 358/342 |
| 4,766,581 A | 8/1988 | Korn et al. | 369/30 |
| 4,782,401 A | 11/1988 | Faerber et al. | 358/335 |
| 4,800,331 A | 1/1989 | Vesce et al. | 323/277 |
| 4,807,224 A | 2/1989 | Naron et al. | 370/94 |
| 4,827,347 A | 5/1989 | Bell | 358/224 |
| 4,882,724 A | 11/1989 | Vela et al. | 364/401 |
| 4,896,791 A | 1/1990 | Smith | 221/7 |
| 4,899,331 A | 2/1990 | Masaki et al. | 369/32 |
| 4,905,077 A | 2/1990 | Ishii | 358/22 |
| 4,905,094 A | 2/1990 | Pocock et al. | 358/342 |
| 4,937,807 A | 6/1990 | Weitz et al. | 369/85 |
| 4,949,322 A | 8/1990 | Kimura et al. | 369/32 |
| 4,962,466 A | 10/1990 | Revesz et al. | 364/518 |
| 4,964,004 A | 10/1990 | Barker | 360/14.1 |
| 4,984,098 A | 1/1991 | Buntsis | 360/12 |
| 5,051,973 A | 9/1991 | Shiba et al. | 369/36 |
| 5,084,768 A | 1/1992 | Stern et al. | 386/98 |
| 5,105,402 A | 4/1992 | Ishii et al. | 369/43 |
| 5,237,157 A | 8/1993 | Kaplan | 235/375 |
| 5,263,199 A | 11/1993 | Barnes et al. | 455/344 |
| 5,341,476 A | 8/1994 | Lowell | 395/200 |
| 5,392,066 A | 2/1995 | Fisher et al. | 348/8 |
| 5,457,376 A | 10/1995 | Chong et al. | 320/2 |
| 5,459,702 A | 10/1995 | Greenspan | 369/25 |
| 5,467,326 A | 11/1995 | Miyashita et al. | 369/30 |
| 5,483,506 A | 1/1996 | Yoshioka et al. | 369/7 |
| 5,504,675 A | 4/1996 | Cragun et al. | 364/401 |
| 5,526,482 A | 6/1996 | Stallmo et al. | 395/182.04 |
| 5,532,680 A | 7/1996 | Ousborne | 340/567 |
| 5,557,721 A | 9/1996 | Fite et al. | 395/148 |
| 5,568,612 A | 10/1996 | Barrett et al. | 395/200.01 |
| 5,583,501 A | 12/1996 | Henrion et al. | 341/118 |
| 5,612,730 A | 3/1997 | Lewis | 348/8 |
| 5,617,565 A | 4/1997 | Augenbraun et al. | 395/604 |
| 5,625,864 A | 4/1997 | Budow et al. | 455/4.2 |
| 5,629,867 A | 5/1997 | Goldman | 364/514 |
| 5,634,022 A | 5/1997 | Crouse et al. | 395/704 |
| 5,640,193 A | 6/1997 | Wellner | 348/7 |
| 5,640,453 A | 6/1997 | Schuchman et al. | 380/10 |
| 5,642,171 A | 6/1997 | Baumgartner et al. | 348/515 |
| 5,642,484 A | 6/1997 | Harrison, III et al. | 395/214 |
| 5,708,845 A | 1/1998 | Wistendahl et al. | 395/806 |
| 5,724,424 A | 3/1998 | Gifford | 380/24 |
| 5,764,901 A | 6/1998 | Skarbo et al. | 395/200.34 |
| 5,784,527 A | 7/1998 | Ort | 386/111 |
| 5,804,803 A * | 9/1998 | Cragun et al. | 235/375 |
| 5,815,471 A | 9/1998 | Mince | 369/30 |
| 5,890,138 A * | 3/1999 | Godin et al. | 705/26 |
| 5,918,214 A * | 6/1999 | Perkowski | 705/27 |
| 5,950,173 A * | 9/1999 | Perkowski | 705/26 |
| 5,971,277 A * | 10/1999 | Cragun | 235/462.01 |
| 5,978,773 A * | 11/1999 | Hudetz et al. | 705/23 |
| 6,045,048 A * | 4/2000 | Wilz, Sr. et al. | 235/472.01 |
| 6,064,979 A * | 5/2000 | Perkowski | 705/26 |
| 6,144,848 A * | 11/2000 | Walsh et al. | 455/419 |
| 6,292,786 B1 * | 9/2001 | Deaton et al. | 705/14 |
| 6,300,880 B1 * | 10/2001 | Sitnik | 340/825.25 |

\* cited by examiner

RECONFIGURABLE AUDIOVISUAL PREVIEWING SYSTEM AND METHOD OF OPERATION

CROSS-REFERENCE TO PROVISIONAL AND RELATED APPLICATIONS

This invention claims priority from a provisional application entitled "DIGITAL DEPARTMENT SYSTEM", Ser. No. 60/055,708, filed Aug. 8, 1997, having Michael Stern as inventor, and having as assignee PICS Previews, Inc., the assignee of the present invention. This provisional application is incorporated herein by reference, in its entirety and for all purposes.

This application is also related to the following commonly-owned, concurrently filed patent applications:

patent application Ser. No. 09/130,900, filed Aug. 7, 1998, entitled "DIGITAL DESIGN DEPARTMENT," still pending;

patent application Ser. No. 09/130,899, filed Aug. 7, 1998, entitled "AUDIOVISUAL CONTENT DISTRIBUTION SYSTEM," now U.S. Pat. No. 6,366,914; and patent application Ser. No. (to be assigned), filed Aug. 7, 1998, entitled "METHOD AND APPARATUS FOR DISTRIBUTING AUDIOVISUAL CONTENT," still pending.

All of these applications are assigned to PICS Previews, Inc., the assignee of the present invention, and are hereby incorporated herein by reference, in their entirety and for all purposes.

BACKGROUND OF THE INVENTION

The present invention relates generally to a system and methods for previewing audiovisual information, and more particularly to a reconfigurable system and methods for previewing audiovisual information thereon related to a product of interest in a commercial environment.

Commercial television and radio have been recognized as a powerful and efficient medium for broadcasting advertising and entertainment content to a large audience. As a result, television and radio have traditionally garnered a major share of advertising budgets. However, due to a variety of factors, advertising revenues for these media outlets have been dropping over the past several years, a trend which is expected to continue. One major drawback of television and radio advertising is the failure of these media to do more than deliver a large number of impressions to a large and relatively undifferentiated audience. Advertising dollars are ineffectively spent on messages that reach the wrong audiences under the wrong circumstances. Further, national network television is not well suited for products or services which are only locally or regionally available. The total cost of multiple regional campaigns to address such issues on local television or radio stations, for example, will often equal or exceed that of a national program.

Point of purchase advertising represents an alternative to broadcasting product information to the general public. In point-of-purchase advertising, the customer identifies a particular product of interest and is subsequently provided with advertisement and other product information at the point of purchase. This system provides a more targeted approach to the delivery of advertisement and entertainment content since the customer is actively seeking the information related to an identified product.

The aforementioned concurrently filed patent applications provides an improved system which can collect and transmit advertisements, promotional information, content, and other information concerning the product of interest to the customer at the point of purchase. What is needed is a listening post which can present this information interactively to the customer upon the identification of the product of interest. Further needed is a listening post which can be reconfigured to provide a variety of functions useful to the listening post's proprietor.

SUMMARY OF THE INVENTION

The present invention provides for a reconfigurable audiovisual previewing system which allows the perspective customer to selectively preview tracks of CDs, clips from motion pictures, computer games and programs and other product media stored in a multimedia server once the product of interest has been identified, for instance by scanning the product's UPC code. Pre-recorded promotional information, demonstrations and advertisements of the product or related products may also be presented, either upon the product's identification or at predetermined times without customer interaction.

In one embodiment, the reconfigurable audiovisual previewing system includes a user interface module, a media communications module, and a plurality of application programs. One of the plurality of application programs is selected and configures the interface module to identify the product of interest. The selected application program also configures the media communications module to transmit, in response to the product's identification, a request for related product information stored in said multimedia server, and to receive and play the product information retrieved from said multimedia file server in response to said transmitted request.

A further understanding of the nature and advantages of the present invention may be realized by reference to the remaining portions of the specification and the drawings.

DESCRIPTION OF THE PREFERRED EMBODIMENT

Contents

I. System Overview
II. Listening Post Software
III. Listening Post Hardware Design
IV. Exemplary Listening Post Configurations
  A. CD Playback Station
  B. End-Cap Kiosk I/O Station
  C. CD LAN Station

I. System Overview

Figure 1:
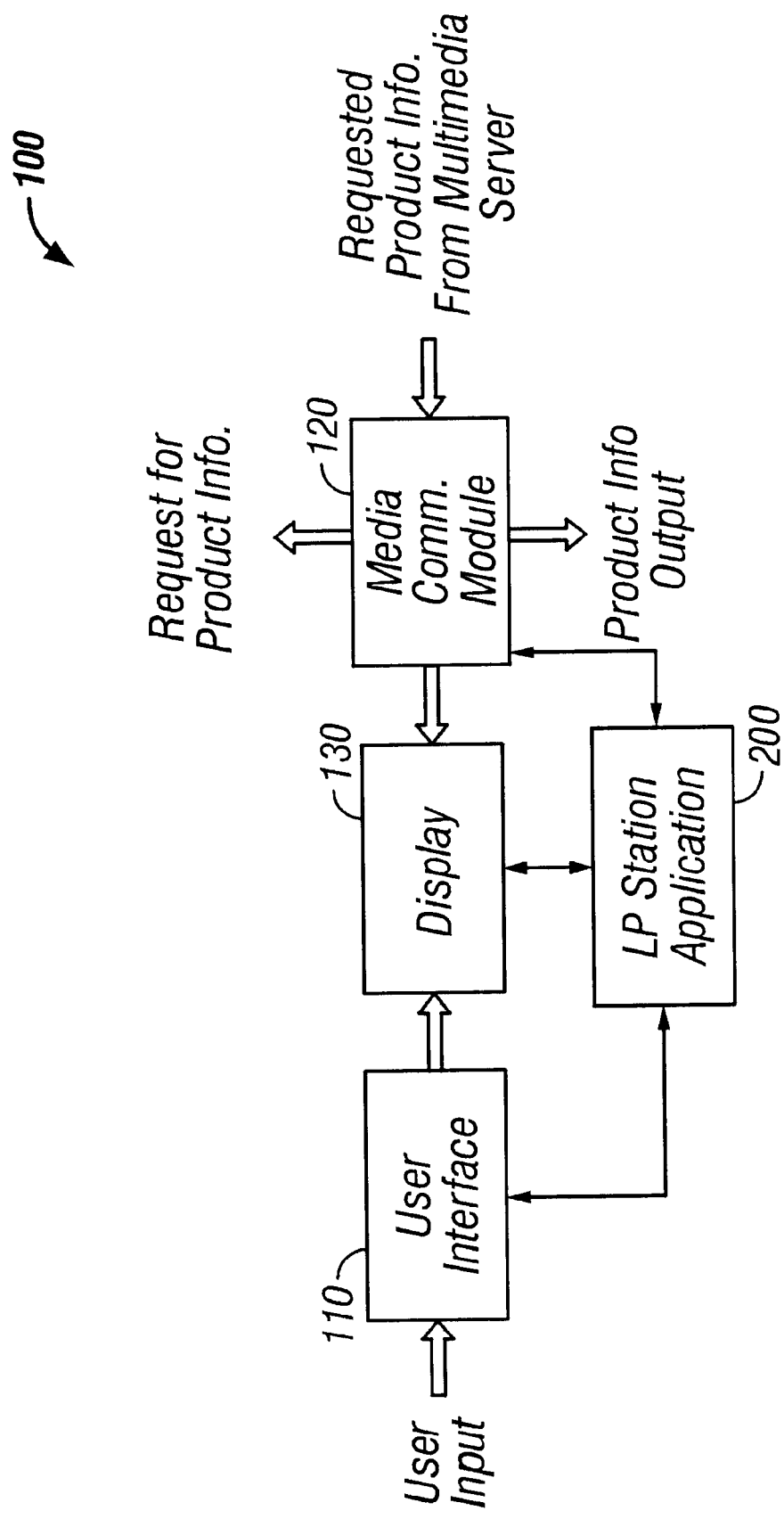
FIG. 1 illustrates a simplified block diagram of the listening post in accordance with the invention.

FIG. 1 illustrates a simplified block diagram of the interactive audiovisual previewing system 100 (hereinafter referred to as a "Listening Post" or "LP station"). The LP station 100 is designed to provide audio and/or video information to the customer. In one embodiment, the LP station 100 operates interactively to allow the customer to preview portions of a variety of products, including (but not limited to) motion picture recordings, audio recordings, computer programs, financial services, travel packages, or other selected products. In another embodiment, the LP station 100 provides promotional information and/or advertisements. In this embodiment, the LP station 100 may operate interactively upon identification of the customer's product of interest, or non-interactively by presenting pre-scripted audio and/or video information.

In one embodiment, the LP station 100 includes a user interface 110, a media communications module 120, a display 130, and a LP station application module 200. The user interface 110 is used to identify the product of interest and control the playback of the information corresponding thereto. The user interface 110 preferably includes a Universal Price Code (UPC) barcode reader, such as those manufactured by Symbol, Inc., along with the required interfaces and drivers, to identify the product of interest. Other embodiments may include mouse/trackball selectors, alpha-numeric keyboards/pads, touch sensitive screens, virtual selectors, as well as other input selection devices.

The user interface 110 may further include control buttons for controlling the playback of the retrieved information. For instance, in a station for previewing audio Compact Disks (CDs) or motion pictures, control buttons such as forward, reverse, play, and +/– volume buttons may be implemented. Alternatively, some or all of these control buttons may be absent in a non-interactive previewing station that provides pre-scripted promotional information or advertisements.

Once the product has been identified, a media communications module 120 transmits a request to a multimedia server (not shown) to retrieve information corresponding to the identified product of interest. The media communications module 120 may employ a wired or wireless communication technique. The retrieved information may be directly controlled by the customer. For instance, a specific audio or video track from a CD or motion picture may be played in response to the customer's input. Alternatively, the retrieved information may be automatically selected based upon the identified product of interest, for instance, promotional information or advertisements corresponding to the selected product.

In response to the transmitted request, the multimedia server provides the requested information to the LP station via the media communication module 120 for example. In one embodiment, the media communications module includes a duplex networking path such as a TCP/IP connection established via an ethernet connection. The link may be wired or wireless. Alternatively, separate transmit and receive channels may be implemented to transmit the request and receive the product information. The retrieved information may be transmitted in compressed form to allow for greater bandwidth and faster communication data rates. Depending upon the LP station's configuration, the requested information may be processed and presented to the customer locally at the LP station or, re-transmitted to a remote location, as described in greater detail below.

A display 130 communicates with the user interface module 110 and the media communications module 120, displaying text and/or graphics associated with and describing the product of interest. The display 130 may, for instance, consist of a flat panel 2 line, 20 character alpha-numeric text display. Other display terminals, such as full graphic display terminals may also be used. The aforementioned control buttons may be incorporated within the display terminal.

II. Listening Post Software

Figure 2:
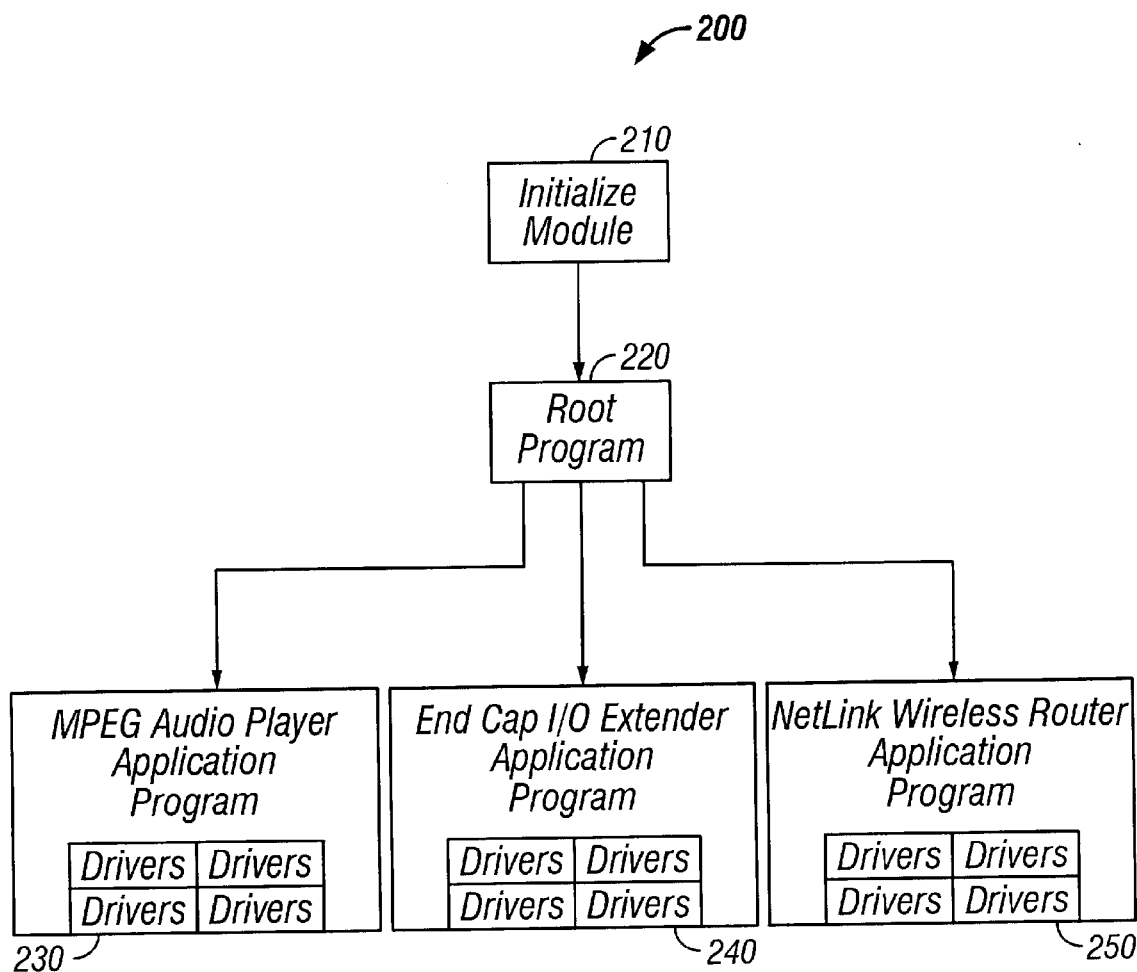
FIG. 2 illustrates the application module of the listening post in accordance with the invention.

FIG. 2 illustrates the organization of the station's application module 200. A processor initialization module 210 configures the CPU peripheral controller registers internal timers, interrupt controller, and other subsystems. A root program 220 initializes the network stack, requests an IP address for the booted LP station, and loads the appropriate application program. The root program 220 is preferably stored in the LP station's non-volatile memory store. Non-volatile memory may be, for example, Flash ROM. Alternatively, it could be downloaded upon boot-up or installed via diskettes.

In one embodiment, the application module includes a MPEG audio application program 230, an end-cap kiosk I/O application program 240, and a wireless router program 250. Other embodiments may contain a larger or smaller number of application programs. As will be described in greater detail below, each application program allows for a different LP station configuration. Each application program manages all user I/O data, gathers statistics for playback activity, and contains any required I/O drivers and functional performance code within its code download. The applications programs 230, 240, and 250 are preferably stored in a volatile memory store such as DRAM memory. Alternatively, files associated with the application could be downloaded separately, or the entire package (application and associated files) could be downloaded and unpackaged using a utility such as the PKZIP™ program or UNIX™ tar program.

The LP station 100 may use any networking protocol as its communications backbone. In one embodiment, a TCP/IP protocol stack is used. The TCP/IP protocol stack serves as the backbone of the network for audio and data file communications. More preferably, a networking protocol is used which contains a set of tools and run time support for the network file system (NFS) protocol, one example being Wind River System's VxWorks™. These systems allows the LP station to open files directly on the multimedia server without actually having to transfer the requisite files from the multimedia server to the LP station 100.

III. Listening Post Hardware Design

Figure 3:
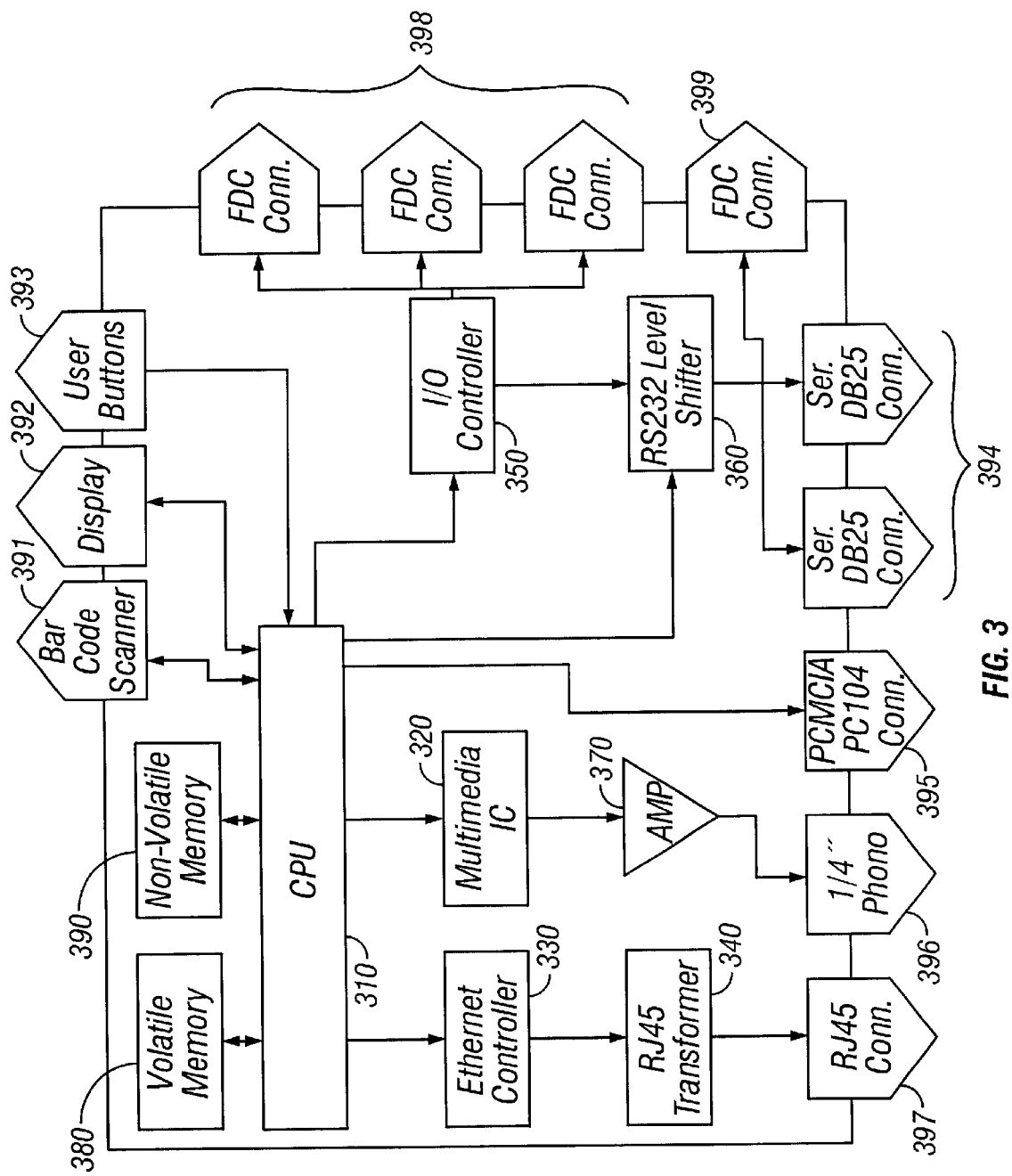
FIG. 3 illustrates one embodiment of the listening post hardware design in accordance with the invention.

FIG. 3 illustrates one embodiment of the LP station's hardware design. The station's hardware includes a CPU unit 310, a multimedia playback IC 320, an ethernet controller 330, a RJ45 transformer 340, an I/O controller 350, a RS232 level shifter 360, an audio amplifier 370, and volatile and non-volatile memory stores 380 and 390. The components are located on a single printed circuit (PC) board. In alternative embodiments, multi-layer PC boards may be used.

In one embodiment, the CPU 310 consists of a high-performance CPU, such as the National Semiconductor embedded CPU NS486SXF. The NS486SXF contains most peripheral sections to reduce the total parts count of the board and contains many features which reduce glue logic. Table I illustrates eight internal chip select pins available with the NS486SXF which may be utilized to reduce the glue logic. Of course, other CPUs could be used.

TABLE I

| Chip Select Pin | Application |
| --- | --- |
| System FLASH ROM | 256/512 Kbytes × 8 bit |
| System DRAM | SIMM module, 2/4/8 Mbytes × 32 bit |
| Ethernet I/O | CS8900 Ethernet controller |
| Multimedia Playback I/O | CS4922 MPEG audio decoder/driver |
| PC/104 Extension I/O | PCMCIA/PC104 extension select |
| Onboard Extension I/O | On board I/O extension circuit |
| LCD display read/write I/O | LCD display |
| I/O Expansion IC | Expansion I/F, 2 Serial ports, 1 Parallel port, IDE, FDC |

In one embodiment, the multimedia playback IC 320 is the Crystal Semiconductor audio decoder CS4922. The CS4922 is self-contained and requires only a simple software driver. Other multimedia decoders may be used, but preferably have the following features:

1. Onboard DSP with RAM based microcode storage.
2. MPEG-1 & 2, Layer 1 & 2 decode.
3. Packetized Audio stream synchronization.
4. Onboard decode RAM.
5. Internal volume/mute stereo controls.
6. Simple connection to the NS486SXF/CPU.

Audio MPEG data may be fed to the IC 320 via two serial pins that are programmed as software shift registers. IC 320 has an internal buffer memory and loads data packets fast enough to allow the device to play for several seconds without further service by the CPU unit 310. IC 320 has an integrated interface controller (I$^2$C) that allows CPU unit 310 to communicate using a serial bus (not shown). IC 320 can be initialized and its microcode loaded via a serial input, for example. I$^2$C is directly provided by the NS486SXF CPU unit as an internal peripheral function.

Ethernet controller 330 is used to provide networking capabilities and, in one embodiment, is the Crystal Semiconductor CS8900. Other ICs could be employed with equal success, of course. In one embodiment, ethernet controller 330 provides the following features:

1. Onboard Memory Manger for packet storage.
2. Onboard EEP controller for physical Ethernet address storage.
3. Boot strap detect for future use as BOOT/TFTP startup.
4. Onboard packet I/O RAM.
5. Simple connection to RJ45 transformer.
6. LED net I/O indicators.
7. Direct connection to an Industry Standard Architecture (ISA) bus.
8. Simple connection to CPU unit 310.

A RJ45 transformer 340 is used to provide connectivity to a RJ45 network port, which in one embodiment consists of a 10BaseT connection.

In an exemplary embodiment, the LP station includes an integrated I/O controller 350 connected to one or more floppy disk controller(s) 398. The I/O controller 350 can be used to support two serial ports in addition to those supported by the NS486SXF, additional parallel ports, and an IDE hard drive. A RS232 level shifter 360 is implemented to convert voltage levels before outputting to serial DB25 connections 399. Volatile and non-volatile memory stores 380 and 390 are preferably implemented as Flash ROM and DRAM memories, respectively.

A bar code reader 391 is connected to an internal serial port within the NS486SXF CPU unit 310. An initialization module can be used to reload the reader configuration parameters on boot-up to ensure the reader is ready and in the proper configuration.

A display 392 may be connected to the CPU in several ways, an example of which includes using a communications protocol having 4 bits of data and one strobe bit. These bits can be programmed as general purpose I/O TTL lines or as specialized LCD data out/refresh pins for a graphic display attached to the NS486SXF.

An optional PCMCIA and/or PC104 connect 395 may be provided to permit connection to various processing system elements. The PCMCIA slot may use, for instance, a Type 1 or 2 card. This card can be a modem, non-volatile memory, RAM, hard drive, cell/wireless communication or other device. A RF modem may be plugged into this slot to allow wireless operation.

Analog audio signals for right and left are amplified and gain-controlled by the NS486 via the I$^2$C two-wire control port and the CS4922 chip. Other methods of controlling the audio signals in the present system will be apparent to one skilled in the art. The design may utilize, for example, a fixed gain buffer amplifier 370 to drive the head phones or small speakers 396.

The hardware of the LP station has now been described for providing previews of audio CD, but the LP station may be equipped to provide other types of media as well. In other embodiments, the LP station 100 may provide previews of motion pictures, computer programs or games, or other media forms in which the customer is interested. In addition, the LP station 100 may be equipped to provide promotional information and/or product advertisements, either interactively once the product has been identified or non-interactively through pre-scripted clips.

IV. Exemplary Listening Post Configurations

The aforementioned hardware architecture allows the LP station to be configured in a number of ways depending upon the type of application program executed. In one embodiment, the LP station may be configured as a CD playback station, an end-cap kiosk I/O station, or a CD LAN station, all of which are described below.

CD Playback Station

Figure 4:
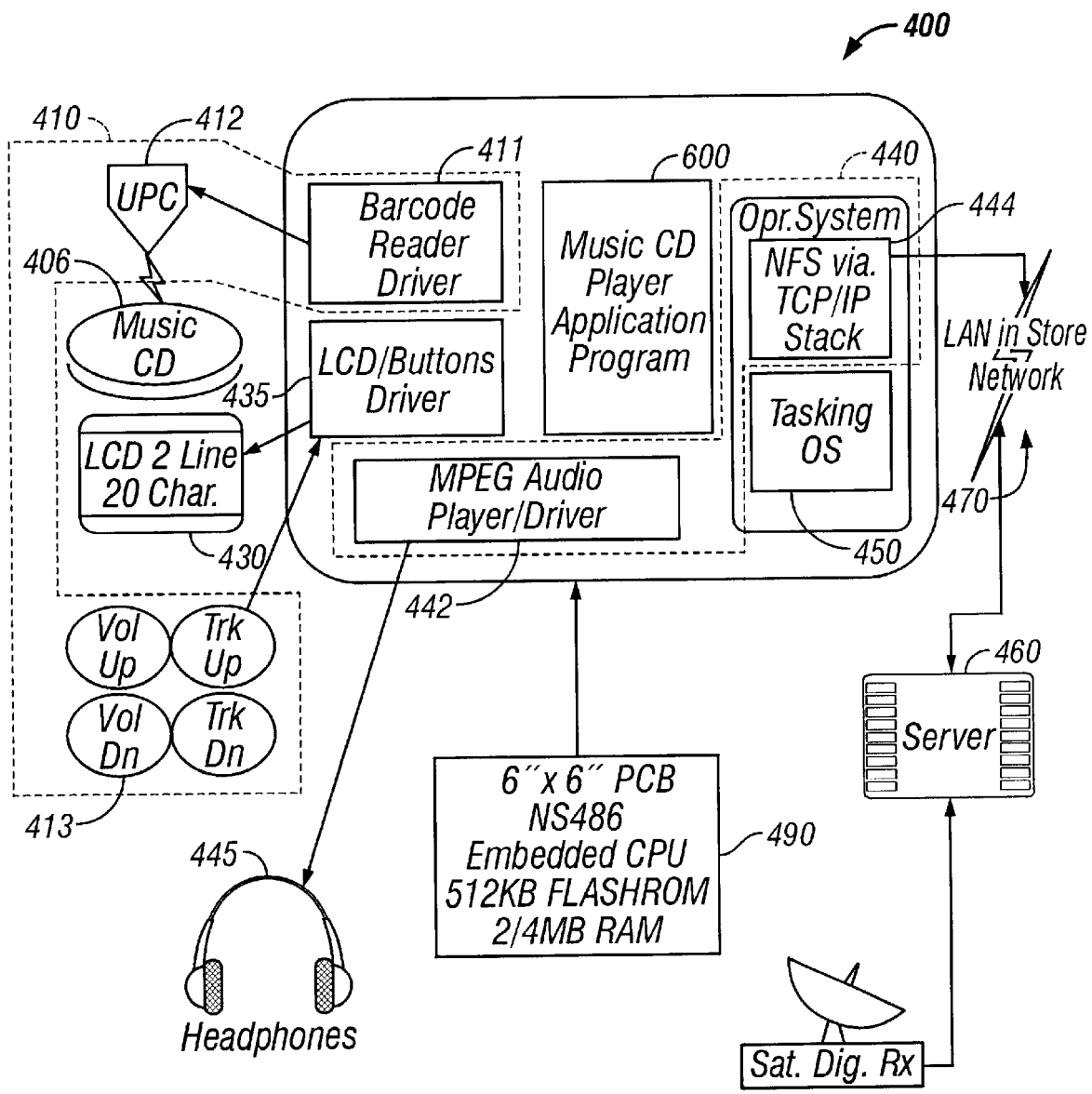
FIG. 4 illustrates the listening post configured as a CD playback station in accordance with the invention.

FIG. 4 illustrates the LP station configured as a CD playback station 400. In this configuration, the CD playback station 400 provides interactive, local playback of selected audio CD tracks in response to customer's selections. Promotional and/or advertisement information corresponding to the selected product may be also provided. The CD playback station 400 includes a user interface 410, a CD player application program 600, a display terminal 430, a media communications module 440, a station O/S 450, and PC board electronics 490, one embodiment of which is shown in FIG. 3. The user interface 410 includes a barcode reader driver 411, a barcode reader 412, and user buttons 413. The display terminal 430 preferably consists of a 2-line, 20 character LCD display. The media communications module 440 includes a MPEG audio player/driver 442 and a TCP/IP network path 444. PC board electronics 490 include an embedded CPU, RAM and ROM memory, as described in FIG. 3. For purposes of illustration, the MPEG audio player (located on the PC board) is shown in combination with the MPEG driver as an MPEG audio player/driver 442. It will be understood that the with minor modifications to the LP station's hardware and software, the station may alternatively, or in addition provide processing and playback of video data as well.

During operation, a customer uses the barcode reader 412 to scan an audio CD 406. Once the UPC is scanned and the product identified, the CD player application program 600 retrieves the associated audio files from the multimedia server 460. In addition, general information may be retrieved to the LCD display 430. A predetermined number of audio clips may be stored for each UPC code and played as directed by the customer. Each scanned UPC and track play may be stored and time stamped for retrieval by the CD playback station 400.

The requested audio files are retrieved through the TCP/IP network path 444. In response, the MPEG audio player/driver 442 processes and plays the requested audio files through headset 445. The MPEG audio player/driver 442 may be fed data from several sources, but preferably data is fed via a direct connection to the NS486 bus, described above. The MPEG audio player/driver 442 may play data from local DRAM storage as it arrives from the network under program control, or may take input data from another location (e.g., a hard disk or zip drive connected to the CD playback station). The MPEG audio player/driver 442 may contain an on-board volume control, controlled by commands received via an I$^2$C serial bus connection.

The CD playback station 440 may begin playing content from the multimedia server 460 immediately upon receipt of the first audio packet, with the remaining packets being streamed in as it is buffered and played. Alternatively, play of the audio files may be delayed until the entire audio file is downloaded from the server to the LP station. The audio clips may continue to be downloaded into a buffer as the initial audio clip plays. If the user plays the same CD repetitively, audio may be provided from a local buffer. Local buffer data is preferably only deleted (i.e., the buffer space re-used) when space is required for new incoming data for another CD title.

The playback volume level is preferably pre-set after a predetermined time has elapsed. This is so that the last user's volume setting is not inadvertently used for the next user. The user may increase or decrease the volume locally via a volume up/down push button. The local processor makes the required adjustment to the MPEG audio decoder/player 442. The CD playback station 400 includes the option of muting the output if the network stream data fails to deliver the requested content on time.

The LCD display terminal 430 displays the tracks requested and/or played. Control buttons 413 are used to select the order and volume of the requested tracks. The CD playback station 400 includes an operating system (O/S) 450 used to run the various station tasks and to communicate with the multimedia file server 460. Communication to the multimedia file server 460 is preferably via a 10BaseT ethernet connection 470 and TCP/IP protocol, although any suitable network protocol hardware may be employed.

Figure 5:
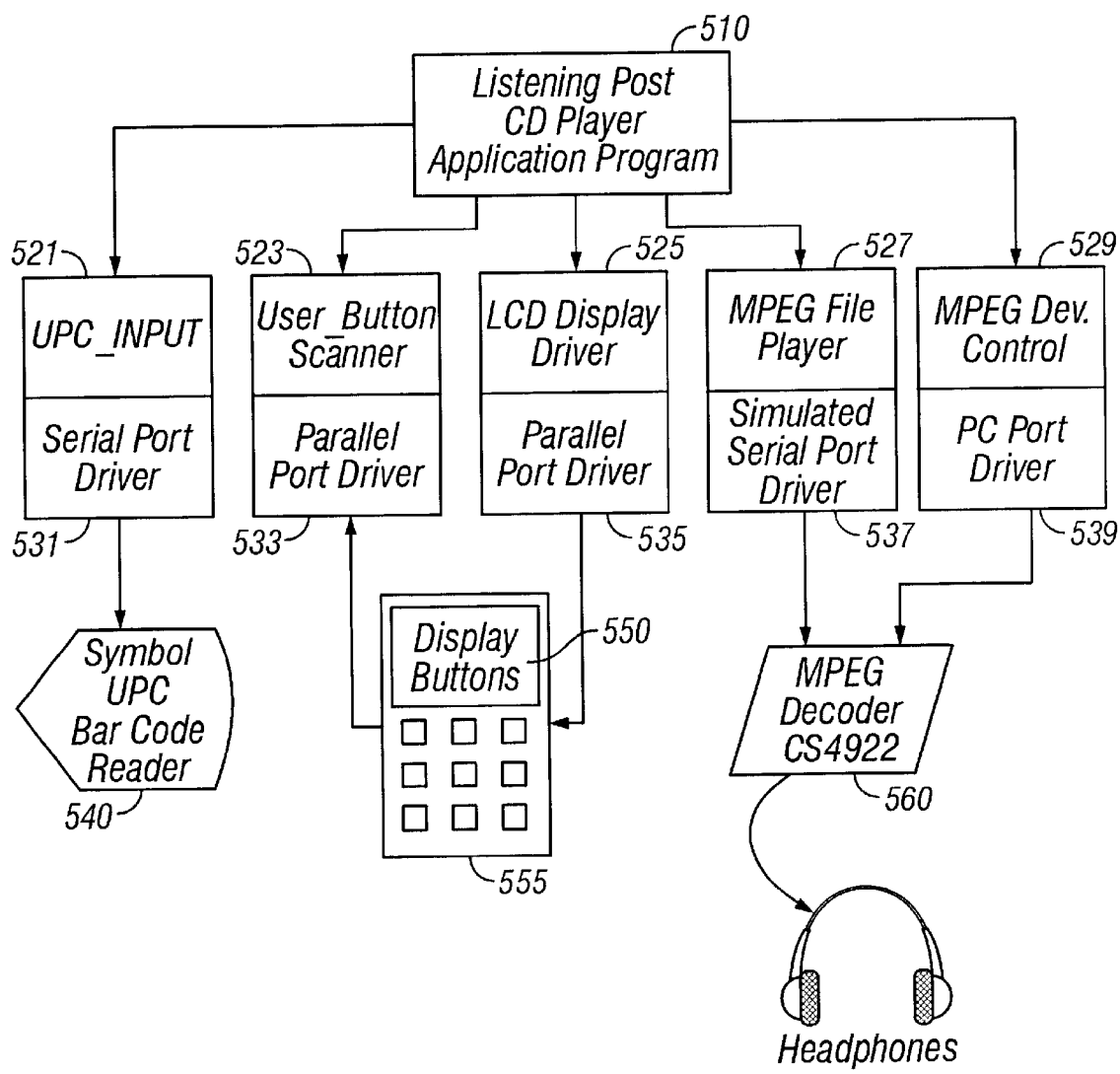
FIG. 5 illustrates the program/driver interface of the listen post when configured as a CD playback station in accordance with the invention.

FIG. 5 illustrates the program/driver interface of the CD playback station 400. The interface is divided into three layers which are the CD player application program 600, program interfaces 521–529, and device drivers 531–539.

The CD player application program 600 communicates with the various drivers to retrieve, process, and output the requested product information. In one embodiment, a serial driver 531 is committed to the bar code (UPC) scanner 540. Parallel drivers 533 and 535 are committed to the user button and the LCD drivers 523 and 525, respectively. An I$^2$C driver 539 is employed to communicate with the MPEG decoder 560.

Several interfaces are implemented to facilitate program control. A UPC_INPUT interface 521 initializes and manages the bar code reader device via a serial port driver. It reads in an entire UPC data packet, formats it as a message and sends it to the application program for processing. This module is configured to periodically activate the laser scanner for product detection.

A User_Button interface 523 scans and detects contact closures for buttons 555 on the parallel port. Contact closures are formatted into predefined messages and sent to the application program for processing.

A LCD_Display interface 525 receives string data for presentation on the display 550. The interface may further scroll text on a timed basis with as many lines as sent to it. Special effects methods may be provided which allow a remote operator to control the display for each CD with horizontal, vertical, flashing effects for any selected string. Other effects and functionality may also be provided, such as the display of graphics. This control method could be in the form of ESC code sequences in a manner such as ANSI terminal control standards.

An MPEG file player interface 527 transfers MPEG encoded files to the device for decoding and playing. A simulated serial port driver 537 may be used to handle shifting MPEG data to the decoder. A hardware shift register option may be added to reduce the CPU's burden of loading MPEG audio data into the decoder IC.

Figure 6:
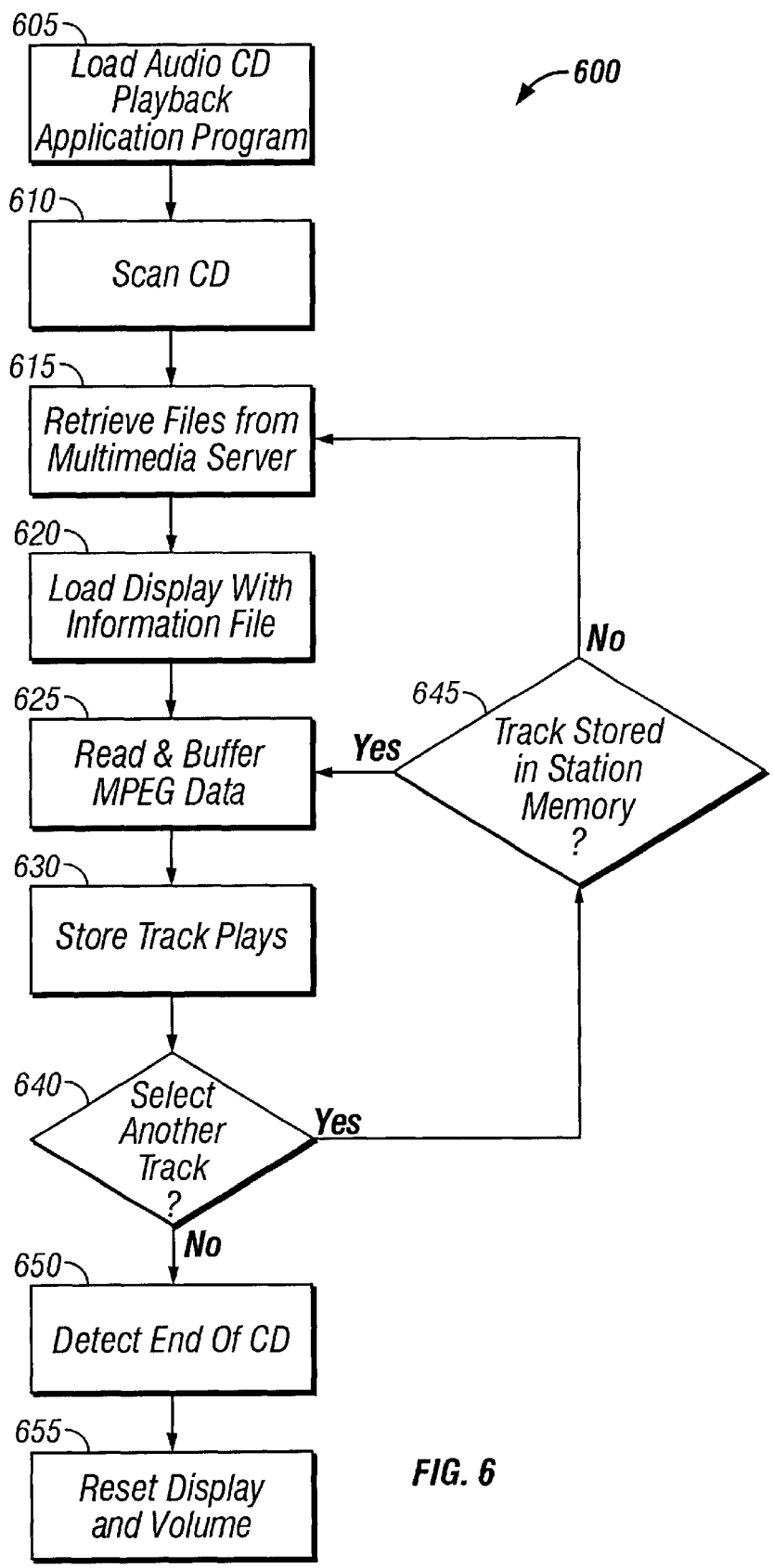
FIG. 6 is a flow chart illustrating the operation of the CD playback station in accordance with the invention.

FIG. 6 is a flow chart illustrating one embodiment of the operation of the CD playback station 400. Initially at step 605, the CD player application program 600 is loaded and the LP station is configured to the CD playback station 400, described above. Next at step 610, a CD 406 is scanned and its UPC code received. Upon receiving the UPC code, the CD playback station 400 accesses the multimedia server's file structure via network file system (NFS) to read the CD's information file, statistics file, and the MPEG audio file (step 615). The information file may be used to load the LCD display with the opening text for the CD and then as the first track begins to play show the song title and track number (step 620).

At step 625, the CD playback station 400 begins reading and buffering MPEG audio data and feeding it to the MPEG file player 527 as blocks are assembled in the station's local memory. The CD playback station 400 continues reading audio data from the multimedia server 460 as directed in the information file section. The audio CD LP station 400 may be configured to automatically play the first track of the scanned CD or play a selected track. As the song plays, the user may adjust playback volume by +/− buttons and advance or rewind to the next available track. All track plays and movement are preferably recorded in the statistics file of the LP station (step 630). Each LP station preferably has it's own directory for statistics and configuration information.

The CD playback station 400 is capable of buffering MPEG audio data until a different CD's UPC is scanned. Additional plays of the same CD thus need not read files from the server. If the user selects a different track (step 640), the CD playback station 400 plays MPEG audio data from its local memory if the clip is present. If the track is not present within local memory, the audio data is retrieved from the multimedia file server 460, as shown in step 645.

Once the application program detects the end of a CD data set (step 650) and after a predetermined time-out period, the LCD display is cleared to a predetermined message and the station's volume is reset to a predetermined level (step 655). The application program may also update the statistics file with the latest statistics collected. If enough system memory is present, the application program may provides the capability of buffering several CD's of data and maintaining a simple data structure to be searched first upon UPC code scans.

The station's configuration is not limited to playback of audio CDs and may present video, audio/video or other forms of media as well motion picture previews and other audiovisual information (e.g., product demonstrations, entertainment, news, and the like) with minor modifications in the station's hardware and application programming.

End-Cap Kiosk I/O Station

Figure 7:
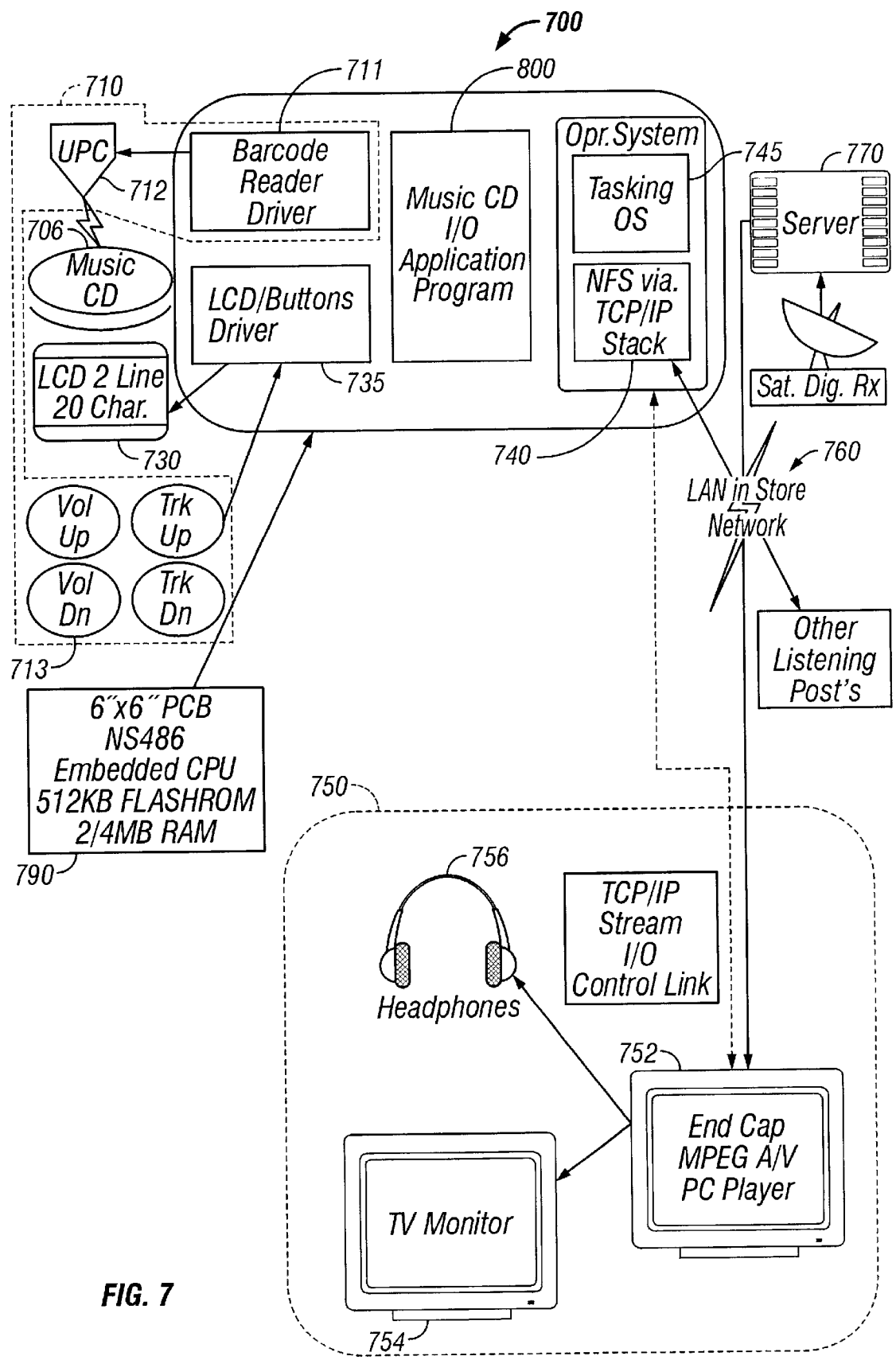
FIG. 7 illustrates the listening post when configured as an end-cap kiosk I/O station in accordance with the invention.

FIG. 7 illustrates the LP station when configured as an end-cap kiosk I/O station 700 (hereinafter referred to as an "I/O station"). In this configuration, the I/O station provides interactive, remote playback of selected audio CD tracks in response to the customer's selections. Promotional and/or advertisement information corresponding to the selected product may be also provided. The I/O station 700 includes a user interface 710, an I/O application program 800, a display terminal 730, a media communications module 740, and PC board electronics 790, one embodiment of which is shown in FIG. 3. The user interface 710 includes a barcode reader driver 711, a barcode reader 712, and user buttons 713. The display terminal 730 consists of a 2-line, 20 character alphanumeric display. The media communications module consists of a TCP/IP networking path, but does not utilize playback hardware or software if it is so equipped. PC board electronics 790 includes a CPU, RAM, and ROM memory stores, as described in FIG. 3.

The I/O station 700 operates similarly to the audio CD playback station 400, one difference being that audiovisual information retrieved from the multimedia server 770 is routed via the I/O station 700 to an end-cap 750. The end-cap 750 may include a PC player 752, TV monitor 754, and headphones 756. Communication with the end-cap 750 may be via a serial LAN 760 with direct wired connection and PPP (point-to-point-protocol) and TCP/IP, although any suitable method of communicating between the end-cap 750 and I/O station 700 may be employed. Network communications techniques, such as streaming, may be implemented. Of course, the I/O station's operation is not limited to processing audio data only. When appropriately equipped, the I/O station 700 may alternatively, or in addition provide video data processing as well.

Figure 8:
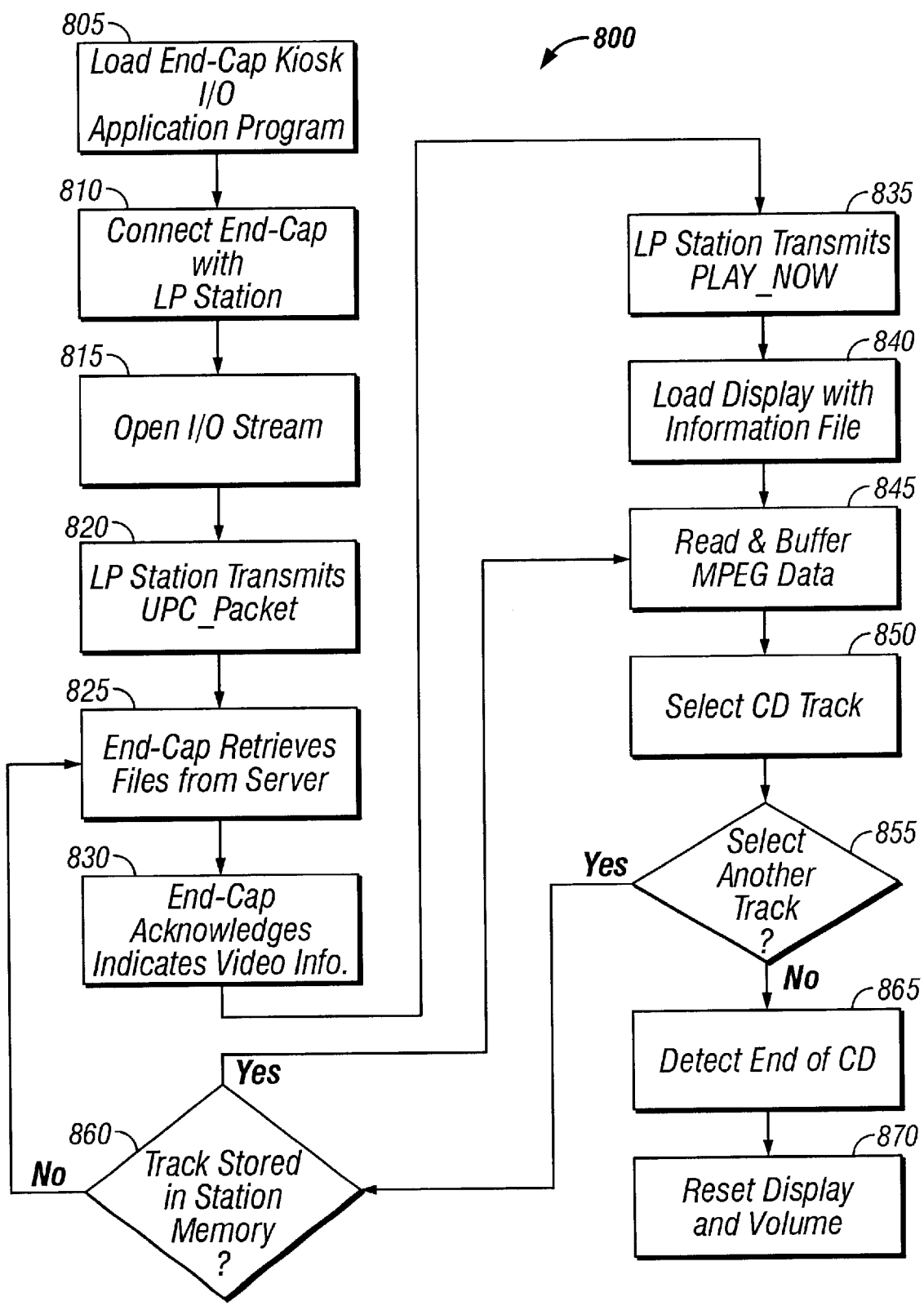
FIG. 8 is a flow chart illustrating the operation of the I/O station in accordance with the invention.

FIG. 8 is a flow chart illustrating one embodiment of the operation of the I/O station 700. Initially at step 805, the I/O application program 800 is loaded and the I/O station 700 is configured to the I/O station 700, as described above. Once configured, the I/O station 700 connects to the end-cap PC 752 (which may be defined in the configuration file) via a networking connection, such as a TCP/IP socket (step 810). The end-cap PC 752 may be defined in the configuration file, or may be selected in another manner, e.g., by searching the network and accessing those end-caps responding. The TCP/IP connection may be established via an ethernet connection, but other networking methods may be employed as well.

Next at step 815, an I/O stream is opened and maintained with the end-cap software. The stream may have basic command functions such identifying the UPC of the scanned product and polling the state of the user buttons. Additionally, the stream may have extended functions, such as indicating product and price for non-A/V items (i.e., items that are not audio or video recordings), or presenting a demonstration of those items.

Several stream messages are passed between the I/O station 700 and the end-cap PC 752. In one embodiment, a UPC_PACKET message is sent when a UPC code is scanned (step 820). The end-cap PC 752 in response retrieves audio, video and information files corresponding to the scanned UPC and prepares to play them (step 825). The end-cap PC 752 replies with an acknowledgement and whether the identified product has any associated video information (step 830). If video information is present, The I/O station 700 retrieves the LCD data and issues a PLAY_NOW command to start things rolling in a coordinated fashion (step 835). If video information is not present, the end-cap PC sends a message to the I/O station 700 to play the audio file as it normally would.

Steps 840–865 of the I/O application program proceeds in much the same way as steps 605–655 of the CD player application program 600 shown in FIG. 6. The I/O station 700 plays track-to-track unless a forward or reverse button is pressed, in which case the I/O station 700 sends a message indicating this (that the FWD_TRACK or REV_TRACK button was pressed) to the end-cap PC 752. If the user changes volume, the I/O station 700 issues either a VOL_UP or a VOL_DOWN message as needed. The end-cap PC 752 can be configured to set it's volume to a preset value when a STOP_CLEAR message is issued. The PLAY_NOW message normally issues after the FWD_TRACK or REV_TRACK messages, to keep the LCD 722 coordinated with the sound and video display streams. The I/O station 700 records each user UPC and track play information with a time stamp in a data file for retrieval by the system. Alternatively, the end-cap PC 752 or the multimedia server 770 can maintain this information.

Figure 9:
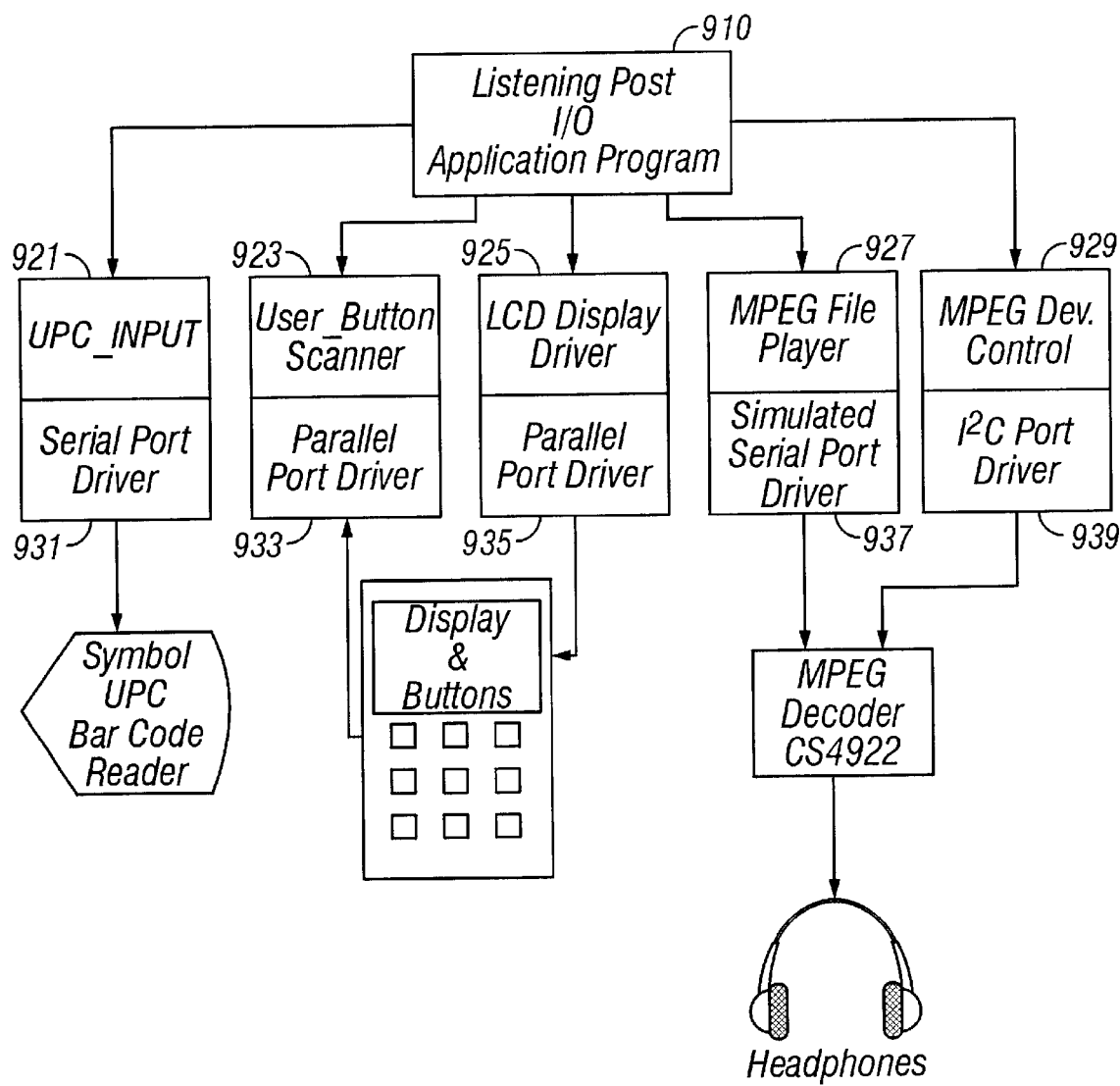
FIG. 9 illustrates the program/driver interface of the I/O station in accordance with the invention.

FIG. 9 illustrates the program/driver interface of the I/O station 700. The I/O station's program/driver interface operates and is structured similarly to the CD playback station's program/driver interface shown in FIG. 5, a difference being that I/O application program does not utilize the MPEG playback and control interfaces 927 and 929, or connecting device drivers 937 and 939. The UPC_INPUT, User_Button Scanner, and LCD Display program interfaces 921, 923, and 925 and device drivers 931, 933, and 935 operate as described in FIG. 5.

CD LAN Station

Figure 10:
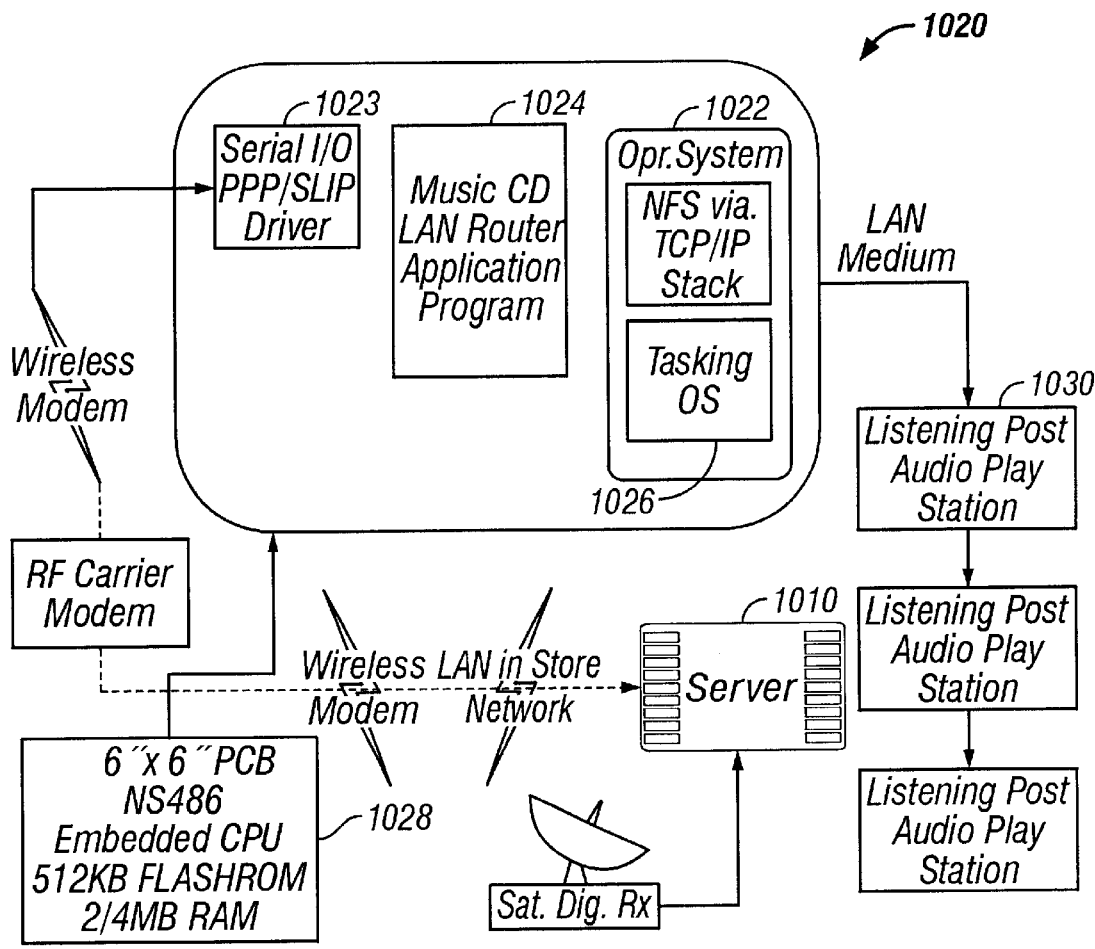
FIG. 10 illustrates the LP station configured to operate as a CD LAN station 1020 in accordance with the invention.

FIG. 10 illustrates the LP station configured to operate as a CD LAN station 1020. The CD LAN station 1020 serves as a connection between the multimedia file server 1010 and other stations 1030 to communicate CD data therebetween. Stations 1030 may include other LP stations, end-cap kiosk I/O stations, or sales islands. Each of the connections may be wireless or hardwired.

In the illustrated embodiment of FIG. 10, the CD LAN station 1020 includes a media communication module 1022, a CD LAN application program 1024, a station O/S 1026, and PC board electronics 1028, one embodiment of which is shown in FIG. 3. A user interface, such as a barcode reader or keypad, is not required since the station in this configuration operates as a data repeater.

The media communications module 1022 operates to transmit and receive commands, data, and audio files to and from the multimedia file server 1010 and the stations 1030. In one embodiment, the media communications module 1022 consists of a wireless RF modem (not shown) for communicating with the multimedia server 1010 and a TCP/IP 10BaseT Ethernet connection between the CD LAN station 1020 and the stations 1030.

The CD LAN application program controls the RF modem, in one embodiment through a serial I/O driver 1023 using, for example, point-to-point protocol (PPP). The aforementioned drivers and program interfaces described in FIGS. 5 and 9 are not required during this configuration and are preferably disabled.

Figure 11:
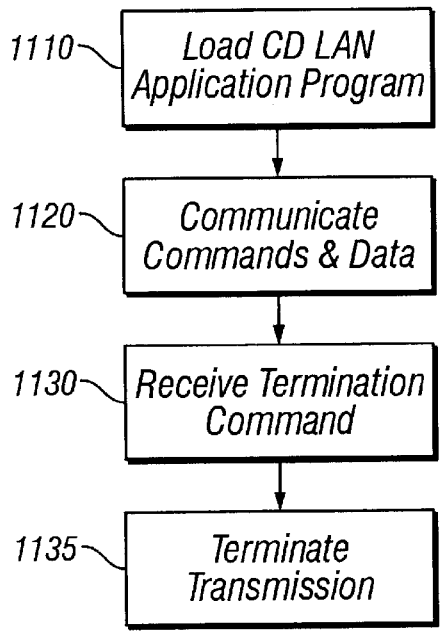
FIG. 11 is a flow chart illustrating the operation of the CD LAN station 1020 in accordance with the invention.

FIG. 11 is a flow chart illustrating one embodiment of the operation of the CD LAN station 1020. Initially at step 1105, the CD LAN application program 1024 is loaded and the LP station is configured to the CD LAN station 1020, described above. Next at step 1110, the CD LAN station 102000 begins communicating commands, such as the UPC_PACKET message and PLAY_NOW, and MPEG audio CD data between the multimedia server 1010 and the stations 1030. The CD LAN station's internal RAM and ROM memory stores may provide additional data buffering. A communication link is terminated when the CD LAN station 1020 receives a message to discontinue transmission, as shown in steps 1130 and 1135.

The station's configuration is not limited to transmission and reception of audio data. With minor modifications in the described station hardware and programming the station could communicate video, audio/video or other forms of media as well motion picture previews and other audiovisual information (e.g., product demonstrations, entertainment, news, and the like).

The present invention provides for a audiovisual previewing system and method of operation. While the invention has been described with reference to specific embodiments, these embodiments are not exhaustive of the scope of the invention. Upon reading this document it will be understood by those skilled in the art that minor changes in form and detail may be made without departing from the present invention, the scope of which is determined by the following claims.

What is claimed is:

1. A reconfigurable audiovisual previewing system for providing product information related to a product of interest from a multimedia server to a customer, the reconfigurable audiovisual previewing system comprising:

a user interface module configured to identify said product of interest;

a media communications module couple to said user interface module and a network management center that creates files with product information for distribution only to selected end clients, said media communications module configured to transmit, in response to said identification, a request for said product information stored in said multimedia server and to receive and play said product information retrieved from said multimedia file server and distributed to the selected end clients in response to said transmitted request, said media communications module including an MPEG audio player; and a plurality of application programs, wherein, in response to execution of one of said application programs, said reconfigurable previewing system is configured to communicate said product information and product information of a second product to said customer, the second product related to the product of interest.

2. The reconfigurable audiovisual previewing system of claim 1, wherein said multimedia communications modules comprises an audiovisual playback circuit configured to receive and present said product information.

3. The reconfigurable audiovisual previewing system of claim 2, further comprising a display module coupled to said user interface and to said media communications module, said display terminal configured to display a portion of said product information.

4. The reconfigurable audiovisual previewing system of claim 1, wherein said user interface module comprises a barcode reader configured to scan a UPC corresponding to said product on interest, and in response, to transmit a formatted message to said application program.

5. The reconfigurable audiovisual previewing system of claim 4, wherein said user interface module further comprises a plurality of control buttons configured to detect depression thereon and, in response, to transmit a formatted messages to said application program.

6. The reconfigurable audiovisual previewing system of claim 5, wherein said multimedia communications module further comprises a TCP/IP network data path coupled to said multimedia server configured to communicate said product information between said audiovisual previewing station and said multimedia server.

7. A reconfigurable audiovisual previewing system for identifying a product of interest and for requesting from a multimedia server the presentation of product information at a remote playback station, the reconfigurable audiovisual previewing system comprising:

a user interface module configured to identify said product of interest;

a media communications module coupled to said user interface module and a network management center that creates files with product information for distribution only to selected end clients, said media communications module configured to transmit, in response to said identification, a request to said remote playback station of a selected end client for said product information retrieved from said multimedia server, said media communications module including an MPEG audio player; and a plurality of application programs, wherein, in response to execution of one of said plurality of application programs, said reconfigurable previewing system is configured to communicate said request to said remote playback station, said remote playback station, in response retrieving and presenting said product information and product information of a second product, the second product related to the product of interest.

8. The reconfigurable audiovisual previewing system of claim 7, wherein said user interface module comprises a barcode reader configured to scan a UPC corresponding to said product of interest and, in response, to transmit a formatted message to said application program.

9. The reconfigurable audiovisual previewing system of claim 8, wherein said user interface module further comprises a pluraltiy of control buttons configured to detect depression thereon and, in response, to transmit a formatted messages to said application program.

10. The reconfigurable audiovisual previewing system of claim 9, wherein said multimedia communications module comprises a TCP/IP network data path coupled to said remote playback station configured to communicate said request between said audiovisual previewing station and said remote playback station.

11. The reconfigurable audiovisual previewing system of claim 10, further comprising a display module to said user interface and to said media communications module, said display terminal configured to display video information provided with said product information.

12. In a reconfigurable previewing system for providing product information from a multimedia file server to selected end clients, a method for providing product information related to a product of interest, the method comprising the steps of:

loading one of a plurality of application programs;

configuring, in response to said application program, said reconfigurable previewing system;

identifying said product of interest;

retrieving said related product information from said multimedia filer server, at least a portion of retrieving including use of an MPEG audio player; and presenting said product information only to a selected end client, and product information of a second product to at least the selected end client, the second product related to the product of interest.

13. The method of claim 12, wherein said step of presenting comprises the steps of:

outputting a portion of audio data contained within said product information;

storing a portion of audio data contained within said product information into a buffer; and loading a display terminal with video data contained within said product information.

14. The method of claim 13, wherein said step of identifying comprises the steps of:

scanning the UPC code of said product of interest; and transmitting a request of said identified product of interest to said multimedia file server.

15. The method of claim 14, wherein said step of configuring comprises the steps of:

connecting said reconfigurable previewing system with a remote playback station; and opening an I/O stream between said reconfigurable previewing station and said remote playback station.

16. The method of claim 15, wherein said step of identifying comprises the steps scanning the UPC code of said product of interest; and transmitting from said reconfigurable previewing station to said remote playback station a message that said product of interest has been identified.

17. The method of claim 16, wherein said step of retrieving comprises the steps:

retrieving, from said multimedia file server to said remote playback station, said product information;

acknowledging to said reconfigurable previewing station said retrieval of said product information; and indicating if said product information contains video information.

18. The method of claim 17, wherein said step of outputting comprises the steps:

if said product information contains video information, providing said video information to said remote playback station; and if said product information contains no video information, providing said product information to said reconfigurable previewing system.

19. A reconfigurable audiovisual previewing system for providing product information related to a product on interest from a multimedia server to a customer, the reconfigurable audiovisual previewing system comprising:

user interface means for identifying said product of interest;

a media communications means coupled to a network management center that creates files with product information for distribution only to selected end clients, the media communications means transmitting, in response to said identification, a request for said product response to said identification, a request for said product information stored in said multimedia server and for receiving and playing said product information retrieved from said multimedia file server in response to said transmitted request, said media communications means including an MPEG audio player; and a plurality of application programs, wherein, in response to execution of one of said application programs, said reconfigurable previewing system communicates said product information and product information of a second product to said customer of a selected end client, the second product related to the product of interest.

20. A reconfigurable audiovisual previewing system for identifying a product of interest and for requesting from a multimedia server the presentation of product information at a remote playback station of a selected end client, the reconfigurable audiovisual previewing system comprising:

user interface means configured for identifying said product of interest;

media communications means coupled to a network management center that creates files with product information for distribution only to selected end clients, the media communications means transmitting, in response to said identification, a request to said remote playback station for said product information stored in said multimedia server, said media communications means including an MPEG audio player; and a plurality of application programs;

wherein in response to execution of one of said plurality of application programs, said reconfigurable previewing system communicates said request to said remote playback station, said remote playback station, in response retrieving and presenting said product information and product information of a second product, the second product related to the product of interest.

* * * * *